United States Patent
Correia et al.

(10) Patent No.: US 10,815,806 B2
(45) Date of Patent: Oct. 27, 2020

(54) ENGINE COMPONENT WITH INSERT

(71) Applicant: General Electric Company, Schenectady, NY (US)

(72) Inventors: Victor Hugo Silva Correia, Milton Mills, NH (US); Robert Francis Manning, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 327 days.

(21) Appl. No.: 15/613,676

(22) Filed: Jun. 5, 2017

(65) Prior Publication Data

US 2018/0347466 A1   Dec. 6, 2018

(51) Int. Cl.
*F01D 9/06* (2006.01)
*F01D 5/18* (2006.01)

(52) U.S. Cl.
CPC ............. *F01D 9/065* (2013.01); *F01D 5/189* (2013.01); *F05D 2240/122* (2013.01); *F05D 2260/202* (2013.01); *F05D 2260/22141* (2013.01); *F05D 2260/607* (2013.01)

(58) Field of Classification Search
CPC .......... F01D 5/188; F01D 5/189; F01D 9/065; F01D 25/00; F01D 25/12; F05D 2260/607; F05D 2260/202
See application file for complete search history.

(56) References Cited

U.S. PATENT DOCUMENTS

| | | | |
|---|---|---|---|
| 4,818,178 A | 4/1989 | Sibbertsen | |
| 4,962,640 A | 10/1990 | Tobery | |
| 5,120,192 A * | 6/1992 | Ohtomo | F01D 5/189 415/115 |
| 5,413,463 A | 5/1995 | Chiu et al. | |
| 6,217,279 B1 | 4/2001 | Ai et al. | |
| 6,238,183 B1 | 5/2001 | Williamson et al. | |
| 7,128,530 B2 | 10/2006 | McFeat et al. | |
| 8,176,720 B2 | 5/2012 | Beeck | |
| 9,523,283 B2 * | 12/2016 | Uechi | F01D 5/189 |
| 9,957,816 B2 * | 5/2018 | Bunker | F02C 7/18 |
| 10,196,910 B2 * | 2/2019 | Jennings | F01D 9/041 |
| 2002/0090294 A1 * | 7/2002 | Keith | F01D 5/189 415/115 |
| 2003/0031555 A1 * | 2/2003 | Noe | F01D 5/189 415/115 |
| 2004/0009066 A1 * | 1/2004 | Soechting | F01D 5/186 416/96 R |
| 2004/0022630 A1 * | 2/2004 | Tiemann | F01D 5/189 416/97 R |
| 2004/0151586 A1 * | 8/2004 | Chlus | F01D 5/187 416/97 R |
| 2005/0002778 A1 * | 1/2005 | Fried | F01D 5/082 415/169.1 |

(Continued)

FOREIGN PATENT DOCUMENTS

GB   2382383 A   5/2003

*Primary Examiner* — David E Sosnowski
*Assistant Examiner* — Hakeem M Abdellaoui
(74) *Attorney, Agent, or Firm* — McGarry Bair PC

(57) ABSTRACT

An apparatus and method for separating dust from a dirty air flow within an airfoil assembly for a turbine engine. The air foil assembly can include a pair of vanes defining a nozzle through which a flow of air can move. At least one of the vanes can include an insert located within an interior of the vane and having a set of holes.

25 Claims, 4 Drawing Sheets

(56) References Cited

U.S. PATENT DOCUMENTS

| | | | | |
|---|---|---|---|---|
| 2006/0120869 A1* | 6/2006 | Wilson | | F01D 5/147 416/97 R |
| 2012/0014810 A1* | 1/2012 | Antunes | | F01D 5/14 416/97 R |
| 2013/0259704 A1* | 10/2013 | Zhang | | F01D 5/081 416/97 R |
| 2014/0079540 A1* | 3/2014 | Morris | | B22F 3/1055 415/178 |
| 2014/0093379 A1* | 4/2014 | Tibbott | | F01D 5/189 416/224 |
| 2014/0341723 A1* | 11/2014 | Bourassa | | F01D 9/065 415/175 |
| 2015/0345397 A1* | 12/2015 | Bunker | | F02C 7/18 416/95 |
| 2016/0222796 A1 | 8/2016 | Spangler et al. | | |
| 2016/0222806 A1* | 8/2016 | Jennings | | F01D 9/041 |
| 2016/0341046 A1* | 11/2016 | Feldmann | | F01D 5/187 |
| 2017/0030199 A1* | 2/2017 | Barker | | F01D 5/189 |
| 2017/0204746 A1* | 7/2017 | Ryon | | F01D 25/32 |
| 2017/0335716 A1* | 11/2017 | Bergholz | | F01D 5/188 |
| 2018/0051572 A1* | 2/2018 | Hoffman | | F01D 25/12 |
| 2018/0229167 A1* | 8/2018 | Rambo | | F02C 7/052 |
| 2019/0186739 A1* | 6/2019 | Moura | | F23R 3/002 |
| 2019/0186740 A1* | 6/2019 | Moura | | F23R 3/06 |
| 2019/0218940 A1* | 7/2019 | Propheter-Hinckley | | F01D 5/187 |
| 2019/0219266 A1* | 7/2019 | Moura | | F01D 25/12 |

* cited by examiner

ENGINE COMPONENT WITH INSERT

BACKGROUND OF THE INVENTION

Turbine engines, and particularly gas or combustion turbine engines, are rotary engines that extract energy from a flow of gases passing through the engine onto a multitude of turbine blades. Turbine engines have been used for land and nautical locomotion and power generation, but are most commonly used for aeronautical applications such as for airplanes, including helicopters. In airplanes, turbine engines are used for propulsion of the aircraft.

Turbine engines for aircraft are designed to operate at high temperatures to maximize engine thrust, so cooling of certain engine components, such as the high pressure turbine and the low pressure turbine, may be necessary. Typically, cooling is accomplished by ducting cooler air from the high and/or low pressure compressors to the engine components which require cooling. When cooling the turbines, cooling air may be passed through an interior of the turbine vanes.

One approach to cooling is to route the compressor air though the interior of the turbine vanes, where the cooling air can pass through inserts to cool portions of the vanes and through an interior of the vane to cool portions of the rotors, such as the rotating disks on which the blades are mounted. When the cooling air is routed through the interior of the vane, dust can be carried within the cooling air and move with the cooling air.

BRIEF DESCRIPTION OF THE INVENTION

In one aspect, the present disclosure relates to an airfoil assembly for a turbine engine comprising an outer wall bounding an interior and defining a pressure side and a suction side extending between a leading edge and a trailing edge to define a chord-wise direction and extending between a root and a tip to define a span-wise direction, a tip opening located at the tip and fluidly coupled to a source of air, at least one trailing edge hole located at the trailing edge. An insert is located within the interior to form within the interior a pressure side chamber fluidly coupled with the source of air and a suction side chamber and defining a distribution chamber having a set of angled holes fluidly coupled to the pressure side chamber and a set of impingement openings fluidly coupled to the suction side chamber.

In another aspect, the present disclosure relates to an engine component for a turbine engine comprising an outer wall bounding an interior and defining a pressure side and a suction side extending between a leading edge and a trailing edge to define a chord-wise direction and extending between a root and a tip to define a span-wise direction, a tip opening located at the tip and fluidly coupled to a source of air, at least one trailing edge hole located at the trailing edge. An insert is located within the interior to form within the interior a pressure side chamber fluidly coupled with the source of air and a suction side chamber and defining a distribution chamber having a set of angled holes fluidly coupled to the pressure side chamber and a set of impingement openings fluidly coupled to the suction side chamber.

In yet another aspect, the present disclosure relates to a method of separating dust from a cooling air flow with an insert within an airfoil the method comprising directing a dirty air flow through a tip opening located at a tip of the airfoil into a first chamber located within the airfoil, separating dust from the dirty air flow through a set of angled holes within the insert into a second chamber to define a clean air flow, passing clean air through impingement openings to impinge the clean air flow onto a suction side of the airfoil, and exhausting the clean air flow through at least one trailing edge hole of the airfoil.

DETAILED DESCRIPTION OF THE INVENTION

Figure 1:
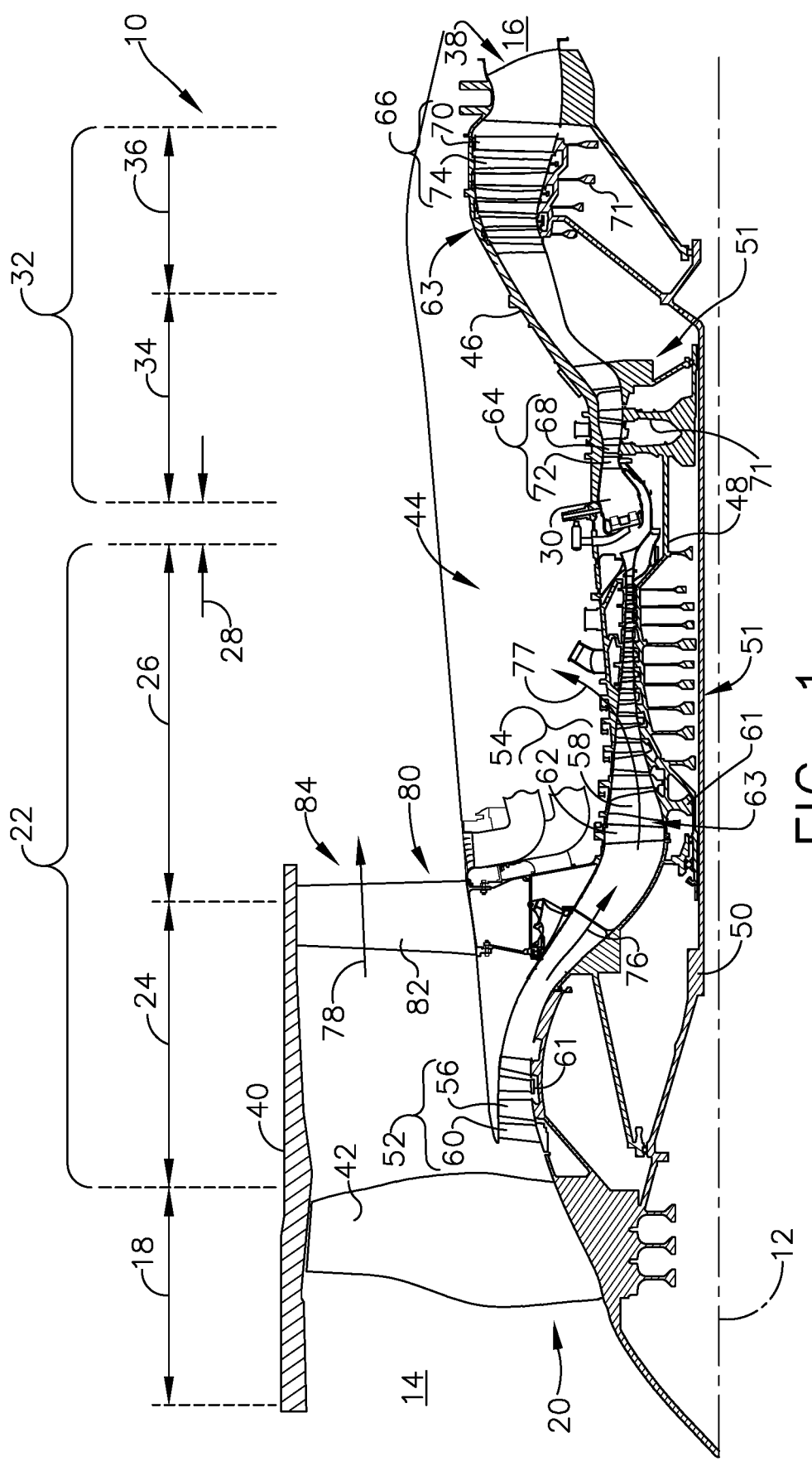
FIG. 1 is a schematic cross-sectional diagram of a turbine engine for an aircraft.

Aspects of the disclosure described herein are directed to cleaning a dirty air flow introduced into an interior of a vane by utilizing an insert with angled holes. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the air flow exiting the fan section 18 splits such that a portion of the air flow is channeled into the LP compressor 24, which then supplies pressurized air flow 76 to the HP compressor 26, which further pressurizes the air. The pressurized air flow 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air flow 76 can be drawn from the compressor section 22 as bleed air 77. The bleed air 77 can be drawn from the pressurized air flow 76 and provided to engine components requiring cooling. The temperature of pressurized air flow 76 entering the combustor 30 is significantly increased. As such, cooling provided by the bleed air 77 is necessary for operating of such engine components in the heightened temperature environments.

A remaining portion of the air flow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the air flow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
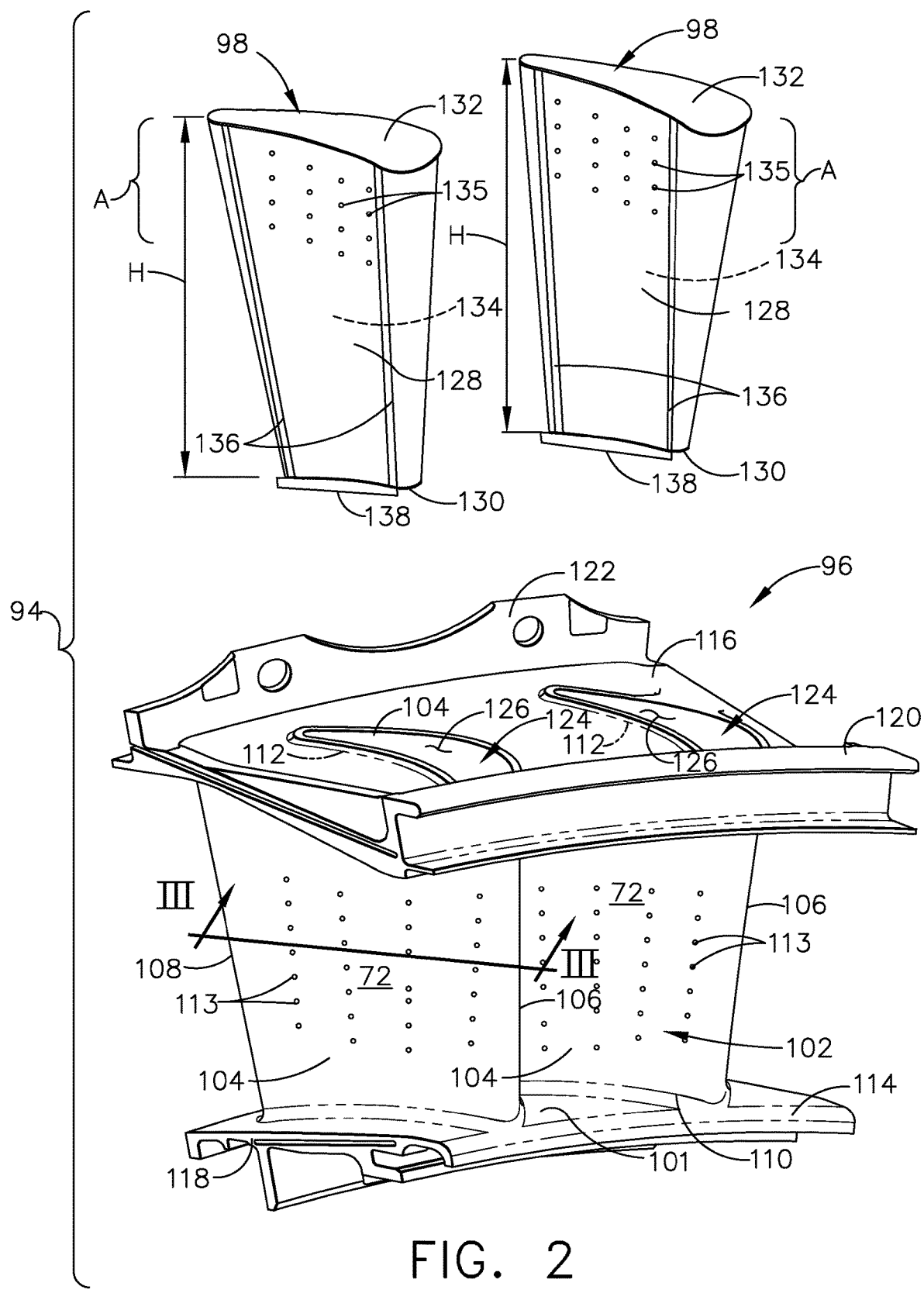
FIG. 2 is an airfoil assembly for the turbine engine of FIG. 1 including an insert.

FIG. 2 is an airfoil assembly, more particularly a nozzle assembly 94 including a nozzle segment 96 and at least one insert 98, illustrated as a pair of inserts 98. The nozzle assembly 94 can be located within the HP turbine 34, it is further contemplated that the nozzle assembly 94 can be anywhere in the engine, including but not limited to the compressor section 22 or the LP turbine 36. The nozzle segment 96 includes a pair of vanes 72 which collectively define a gap 101 therebetween referred to as a nozzle 102. A plurality of nozzle segments 96 can be arranged circumferentially to form a turbine nozzle assembly. The vane 72 includes an airfoil 104 having a leading edge 106 and trailing edge 108. The vane 72 spans radially from a root 110 to a tip 112 and can include a plurality of cooling holes 113. The root 110 is mounted to an inner band 114 and the tip 112 is mounted to an outer band 116. The inner band 114 can include platform segments 118 to which the root 110 of the vane 72 is mounted. The outer band 116 spans axially from a forward rail 120 to an aft rail 122. An opening 124 to an interior 126 of the vane 72 is provided between the forward rail 120 and the aft rail 122 within the outer band 116.

The insert 98 extends from a base 130 to a cap 132 and is enclosed by an insert wall 128 to define a distribution chamber 134. The insert 98 can include a plurality of angled holes 135 proximate the cap 132, by way of non-limiting example in an area (A) no more than three quarters of a height (H) from the cap 132 where (H) is a radial length measured from the base 130 to the cap 132. The insert 98 further includes at least one radial tab 136, in the illustrated example two radial tabs 136, extending along the insert wall 128 from the cap 132 to the base 130. Additionally, a base tab 138 extends radially from the base 130 of the insert 98.

Figure 3:
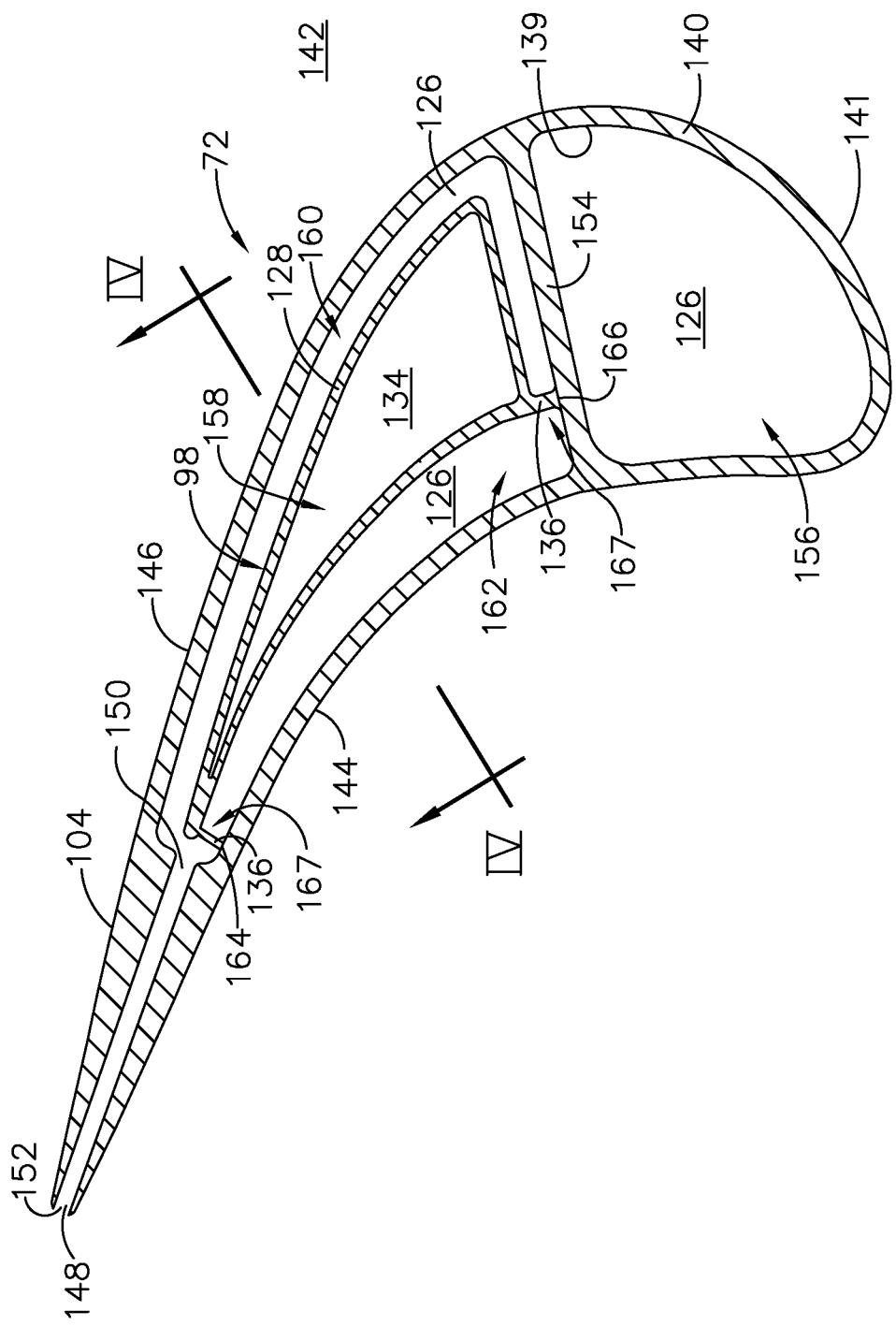
FIG. 3 is a cross sectional view along line of an airfoil for the airfoil assembly of FIG. 2.

A cross-section of the vane 72 taken along line of the insert 98 within the interior 126 of the vane 72 is illustrated in FIG. 3. The airfoil 104 is further defined by an outer wall 140 having an interior surface 139 and an exterior surface 141. The outer wall 140 separates an exterior 142 of the vane 72 from the interior 126 of the vane 72 and defines a pressure side 144 and a suction side 146. At least one trailing edge hole 148 is provided within the vane 72 and extends from an inlet 150 to an outlet 152 fluidly coupling the interior 126 of the airfoil 104 to the exterior 142 of the airfoil 104 at the trailing edge 108. The at least one trailing edge hole 148 can be located proximate any portion of the trailing edge 108 including, but not limited to along the pressure or suction sides 144, 146 proximate the trailing edge. In one non-limiting example it is contemplated that the at least one trailing edge hole 148 is a plurality of trailing edge holes 148 extending along the trailing edge 108 of the vane 72 from root 110 to tip 112.

By way of non-limiting example, one or more ribs 154, can separate the interior 126 into a leading edge cooling passage 156 and a central cooling passage 158. While illustrated as having two cooling passages, it should be understood that the interior 126 of the vane 72 can include more or less cooling passages and that the cooling passages depicted are for illustrative purposes and not meant to be limiting. The insert wall 128 of the insert 98 defines the distribution chamber 134 and separates the central cooling passage 158 into a suction side chamber 160 and a pressure side chamber 162 to define three distinct chambers.

At least one radial tab 136 of the insert 98 is joined to the interior surface 139 at a joint 164 proximate the inlet 150 of the trailing edge hole 148 such that the suction side chamber 160 is fluidly coupled to the trailing edge hole 148 at the inlet 150. Another of the radial tabs 136 is joined at a joint 166 along the rib 154. The joints 164, 166 further define the suction side chamber 160 and the pressure side chamber 162 by creating a seal 167 between the suction and pressure side chambers 160, 162. The joints 164, 166 can be, by way of non-limiting example braze joints. The joints 164, 166 can be joined at any location along the interior surface 139 and are not limited to the exemplary joints 164, 166 illustrated. The suction side chamber 160 and the pressure side chamber 162 are separated by the radial tabs 136 and are indirectly fluidly coupled via the distribution chamber 134. It is further contemplated that the seal 167 is a partial seal between the suction side chamber 160 and the pressure side chamber 162 where the sealing level provides a static pressure in the pressure side chamber 162 greater than a static pressure in the suction side chamber 160.

Figure 4:
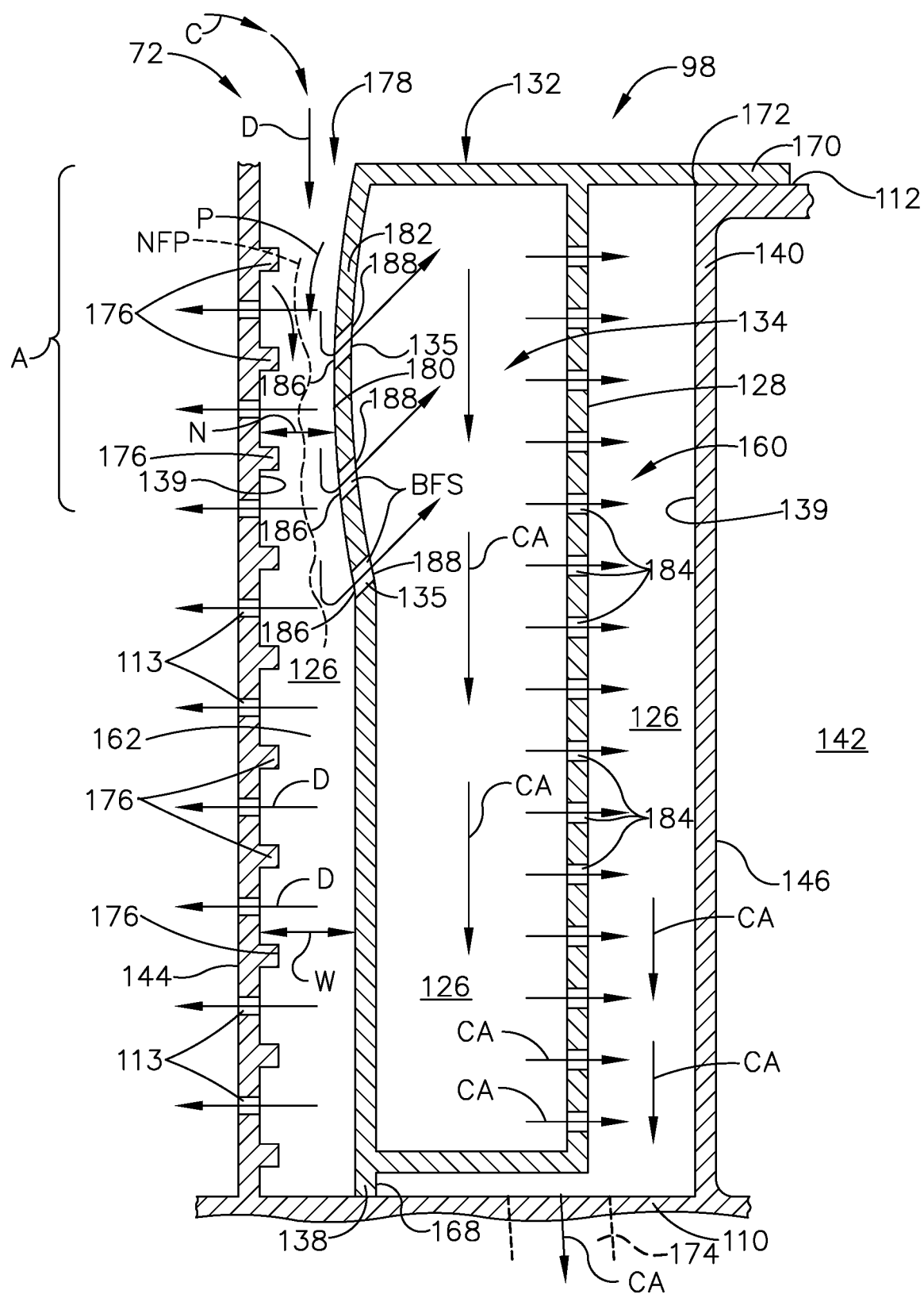
FIG. 4 is a cross sectional view along line IV-IV of for the airfoil of FIG. 3.

Turning to FIG. 4, a cross sectional view of the vane 72 taken along line IV-IV of FIG. 3 includes a root joint 168 where the base tab 138 is joined to the interior surface 139 at the root 110 of the vane 72. The root joint 168, can be by way of non-limiting example a braze joint. A lip 170 extends from the cap 132 of the insert 98 and is joined to the outer wall 140 at the tip 112 along the outer band 116 to define a tip joint 172. The tip joint 172 can be by way of non-limiting example a braze joint. The suction side chamber 160 extends in a radial direction from the base tab 138 to the lip 170. It is further contemplated that a root opening 174 is provided within the suction side chamber 160 at the root 110 fluidly coupling the exterior 142 to the interior 126 at the root 110.

A set of turbulators 176 is provided on the interior surface 139 along the pressure side 144 within the pressure side chamber 162. The turbulators 176 can be any suitable heat transfer enhancer utilized to increase flow turbulence and convection area of the interior surface 139 between the insert wall 128 and the pressure side of the outer wall 140. Other similar heat transfer enhancers, in non-limiting examples, can include bumps, chevrons, protrusions, or protuberances, as well as negative features formed into the interior surface 139 of the outer wall 140, such as dimples, grooves, channels, or divots. Similarly, the interior surface 139 of the outer wall 140 can be contoured to defined flow enhancing shapes, without the requirement of positive material to define the heat transfer enhancer.

A tip opening 178, or inlet is located at the tip 112 between the pressure side 144 and the cap 132 of the insert 98. The tip opening 178 can be of any size while fluidly coupling the exterior 142 to the interior 126 of the pressures side chamber 162. A Mach number within the pressure side chamber 162 proximate the angled holes 135 is greater than 0.05. In an exemplary manner of achieving a Mach number greater than 0.05, the tip opening 178 can provide access to a narrow passage 180 where a width (N) in the pressure side chamber 162 at the narrow passage 180 is less than a width (W) at a further location within the pressure side chamber 162. The narrow passage 180 of the pressure side chamber 162 located proximate the tip 112 within the area (A) and defined between a convex bend 182 with respect to the pressure side chamber 162 and the interior surface 139 of the outer wall 140. While illustrated as having a convex bend 182 along the insert wall 128, the convex bend 182 is one exemplary geometry for achieving a Mach number greater than 0.05. Accordingly it is further contemplated that no convex bend 182 is provided and the pressure side chamber 162 is without a narrow passage 180.

A set of impingement openings 184 are provided along the insert wall 128 proximate the suction side 146 and fluidly coupling the distribution chamber 134 to the suction side chamber 160. The set of impingement openings 184 can be multiple impingement openings provided along the entire height (H) of the insert 98. It should be understood that the impingement openings 184 can be more or less than those described and that the location and number of impingement openings 184 illustrated are for exemplary purposes only and not meant to be limiting.

The angled holes 135 within the insert wall 128 proximate the pressure side 144 are backward facing steps (BFS). They are (BFS) in that an angled hole inlet 186 in the pressure side chamber 162 is radially inward from an angled hole outlet 188 in the distribution chamber. When a cooling air flow enters a BFS, the air is forces to move in an opposite direction of the original motion of the air.

The tip opening 178 can receive a cooling fluid from a source of air at the tip of the vane. The source of air can be, by way of non-limiting example, the bleed air 77 or air flow 78 (FIG. 1) to define a cooling air flow (C) The cooling air flow (C) can be a dirty air flow (D) having picked up dust during operation. A method of separating the dust from the cooling air flow (C) includes directing the dirty air flow (C) through the tip opening 178 into a first chamber being the pressure side chamber 162. The method can include pinching the dirty air flow (C) along a narrow flow path (NFP) within the narrow passage 180 of the pressure side chamber 162. Flowing dirty air flow (C) along the narrow flow path (NFP) causes an increasing of a relative velocity of the dirty air flow (D) within the narrow passage 180. Additionally the cooling air (C) travels at a relatively higher velocity down the pressure side chamber 162 and is enhanced by the turbulators 176. Some of the dirty air flow (D) is directed through the set of cooling film holes 113 along the pressure side 144. The cooling film holes 113 fluidly couple the exterior 142 to the pressure side chamber 162. The turbulators 176 can create turbulence in the cooling air flow (C) and aid in moving dust within the dirty air flow (D) out of the pressure side chamber 162.

Separating the dust from the dirty air flow (D) occurs through the angled holes 135, in particular through the BFS. In making at least a 90 degree turn, the cooling air flow (C) moves into a second chamber, as disclosed herein the distribution chamber 134, to define a clean air flow CA. Passing the clean air flow (CA) through the impingement openings 184 results in impinging the clear air flow (CA) onto the interior surface 139 at the suction side 146. Cleaning the cooling air flow (C) prior to impinging the cooling air flow (C) onto the interior surface 139 prevents clogging of the impingement openings 184 of the insert 98 and less dust caking accumulated on the suction wall 139.

Finally the method includes exhausting the clean air flow (CA) through the at least one trailing edge hole 148 (FIG. 3) of the vane 72. Exhausting the clean air flow (CA) can also occur through the root opening 174 within the suction side chamber 160. It is contemplated that the nozzle assembly 94 as described herein can include only trailing edge holes 148, only root impingement openings 174, or a combination of trailing edge holes 148 and root impingement openings 174. It is further contemplated that the holes through which the (CA) is exhausted are not limited to trailing edge holes 148 or root impingement openings 174 and can be located elsewhere within the nozzle assembly 94.

A benefit of the insert as described herein is that dust present in the cooling air is directed to the pressure side of the airfoil where it cools the outer wall on the pressure side with the aid of the turbulators. To prevent clogging of cooling holes on the vane and prevent dust accumulation on the interior surface which reduces any cooling effectiveness, it is desirable to remove dust from the cooling air. The turbulators aid in directing dust that tends to accumulate within the pressure side chamber out through the cooling film holes. In addition, the pressure side of the airfoil can readily be cooled by multiple rows of film with a minimum aerodynamic performance impact and as such is more tolerant to the negative effects of dust build up than the airfoil suction side region.

When the cooling air flow enters the insert through the (BFS) angled holes, the change in momentum causes dust to leave the air flow and remain in the pressure side chamber. Impinging the clean air flow on the interior surface of the suction side results in less dust deposit, minimizes dust accumulation, and improves durability for the vane.

A reduction in dust accumulation within the interior of the vane reduces internal dust caking in the cooling passages of the nozzle assembly, thus improving component durability and increasing time on wing. In terms of environmental capabilities, nozzle assemblies with the insert installed as described herein have a higher tolerance for dust laden environments. This also translates to a higher performance in terms of the retention of the engine.

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine comprising:
an outer wall bounding an interior and defining a pressure side and a suction side extending between a leading edge and a trailing edge to define a chord-wise direction and extending between a root and a tip to define a span-wise direction;
a tip opening located at the tip and fluidly coupled to a source of air;
at least one trailing edge hole located at the trailing edge; and
an insert located within the interior to form within the interior a pressure side chamber fluidly coupled with the source of air and a suction side chamber and defining a distribution chamber having a set of angled holes each extending between an angled hole inlet fluidly coupled to the pressure side chamber and an angled hole outlet fluidly coupled to the distribution chamber where the angled hole inlet is radially spaced from the angled hole outlet and a set of impingement openings fluidly coupled to the suction side chamber;
wherein the distribution chamber is fluidly coupled in series between the pressure side chamber and the suction side chamber.

2. The airfoil assembly of claim 1 wherein the set of angled holes are located proximate the tip.

3. The airfoil assembly of claim 1 wherein the pressure side further includes a set of cooling holes fluidly coupled with the pressure side chamber.

4. The airfoil assembly of claim 3 wherein the pressure side chamber further includes a set of turbulators provided along the pressure side and proximate the set of angled holes.

5. The airfoil assembly of claim 1 wherein the distribution chamber is enclosed by a base and a cap.

6. The airfoil assembly of claim 5 wherein the cap further includes a lip and the lip defines a tip joint at the tip.

7. The airfoil assembly of claim 5 wherein the base is joined to an interior surface at the root to define a root joint.

8. The airfoil assembly of claim 1 wherein the insert is joined to an interior surface at the root and to the outer wall at the tip to define the suction side chamber.

9. The airfoil assembly of claim 1 wherein the insert further comprises radial tabs joined to an interior surface of the airfoil to form a seal.

10. The airfoil assembly of claim 9 wherein the seal is a partial seal and a static pressure within the pressure side chamber is greater than a static pressure within the suction side chamber.

11. The airfoil assembly of claim 1 wherein the pressure side chamber further includes a narrow passage defining a narrow flow path at the tip opening.

12. The airfoil assembly of claim 1 wherein the suction side chamber is fluidly coupled to a root opening located at the root of the airfoil.

13. An insert for an airfoil of a turbine engine, the insert comprising:
- a base;
- a cap; and
- an insert wall, enclosing a distribution chamber extending between the base and the cap to define a radial direction, and having a set of angled holes each extending between an angled hole inlet and an angled hole outlet fluidly coupled to the distribution chamber where the angled hole inlet is radially spaced from the angled hole outlet along a first side of the insert wall and having a set of impingement openings located along a second side of the insert wall opposite the first side allowing a cooling flow to flow in series from the set of angled holes through the distribution chamber to the set of impingement openings.

14. The insert of claim 13, wherein the set of angled holes are located proximate the cap.

15. The insert of claim 13, wherein the cap further includes a lip and the lip is joined to the airfoil to define a tip joint.

16. The insert of claim 13, wherein the base is joined to an interior surface of the airfoil to define a root joint.

17. The insert of claim 13, wherein the insert is joined to an interior surface of the airfoil at the base and to an outer wall of the airfoil at the cap to define a suction side chamber.

18. The insert of claim 17, wherein the insert further comprises radial tabs joined to an interior surface of the airfoil to form a seal.

19. The insert of claim 18, wherein the seal is a partial seal and a static pressure within a pressure side chamber of the airfoil defined at least partially by the insert is greater than a static pressure within the suction side chamber.

20. The insert of claim 19, wherein the pressure side chamber further includes a narrow passage defining a narrow flow path at a tip opening.

21. A method of separating dust from a cooling air flow within an airfoil the method comprising:
- directing a dirty air flow through a tip opening located at a tip of the airfoil into a first chamber located within the airfoil;
- separating dust from the dirty air flow by turning the dirty air flow through an angle of at least 90 degrees;
- passing a clean air flow through a set of angled holes having an inlet and an outlet radially spaced from each other within an insert defining a second chamber;
- passing the clean air flow in series from the first chamber into the second chamber;
- passing the clean air flow in series through impingement openings into a third chamber to impinge the clean air flow onto a suction side of the airfoil; and
- exhausting the clean air flow through at least one trailing edge hole of the airfoil.

22. The method of separating dust from a cooling air flow of claim 21 wherein the directing a dirty air flow further includes passing the dirty air flow through angled holes on a pressure side of the airfoil.

23. The method of separating dust from a cooling air flow of claim 22 wherein the directing a dirty air flow further includes pinching the dirty air flow through a narrow passage in the first chamber.

24. The method of separating dust from a cooling air flow of claim 23 wherein the pinching the dirty air flow includes increasing a relative velocity of the dirty air flow.

25. The method of separating dust from a cooling air flow of claim 21 wherein the exhausting the clean air flow also occurs through a root of the airfoil at a root opening.

* * * * *